United States Patent
Spallin

(10) Patent No.: US 6,577,412 B2
(45) Date of Patent: Jun. 10, 2003

(54) SYSTEM AND METHOD OF DETERMINING END POINT CANDIDATES FOR AN OPTICAL CHANNEL IN A DATA NETWORK

(75) Inventor: James A. Spallin, Allen, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/776,131

(22) Filed: Feb. 2, 2001

(65) Prior Publication Data

US 2002/0149816 A1 Oct. 17, 2002

(51) Int. Cl.[7] .............................................. H04B 10/08
(52) U.S. Cl. ..................... 359/110; 359/119; 370/405; 370/409; 370/413
(58) Field of Search .............................. 359/118, 119, 359/110; 370/405, 409, 413, 452

(56) References Cited

U.S. PATENT DOCUMENTS 5,345,446 A * 9/1994 Hiller et al. ................ 370/60.1
6,163,527 A  12/2000 Ester et al. .................. 370/228

OTHER PUBLICATIONS

World Wide Web, http://www.cis.ohio-state.edu/~jain/788-97/virtual_lans/index.htm, Suba Varadarajan, "Virtual Local Area Networks", printed on Feb. 7, 2000, 12 pages.
World Wide Web, http://www.ietf.org/internet-drafts/draft-ietf-mpls-arch-07.txt, Eric C. Rosen, "Multiprotocol Label Switching Architicture", printed on Jan. 1, 2001, 55 pages.
World Wide Web, http://www.ietf.org/internet-drafts/draft-ietf-mpls-generalized-rsvp-te-00 Peter Ashwood-Smith, et al., "Generalized MPLS Signaling –RSVP-TE Extensions", printed on Jan. 9, 2001, 19 pages.
Yates, Jennifer, et al., "Reconfiguration in IP Over WDM Access Networks", AT&T Labs–Research, AT&T Shannon Laboratories, 4 pages.
Copyright 2000 by the Institute of Electrical and Electronics Engineers, Inc., "Local and Metropolitan Area Networks", IEEE Standard for Information technology, published Oct. 16, 2000, pp. 40–50.

* cited by examiner

*Primary Examiner*—Kinfe-Michael Negash
(74) *Attorney, Agent, or Firm*—Marc A. Hubbard; Munsch Hardt Kopf & Harr, P.C.

(57) ABSTRACT

A method of determining end points for an optical channel in an optical network to off-load traffic from a target optical link is provided. The method includes the steps of identifying ingress network nodes sourcing traffic through the target optical link, and determining an average ingress bandwidth sourced by the ingress network nodes. Thereafter, the method includes the steps of identifying egress network nodes sinking traffic from the target optical link, and determining an average egress bandwidth sunk by the egress network nodes. The optical channel start point candidates are identified to include ingress network nodes sourcing more traffic than the average ingress bandwidth, and the optical channel end point candidates are identified to include egress network nodes sinking more traffic than the average egress bandwidth.

30 Claims, 2 Drawing Sheets

SYSTEM AND METHOD OF DETERMINING END POINT CANDIDATES FOR AN OPTICAL CHANNEL IN A DATA NETWORK

TECHNICAL FIELD OF THE INVENTION

This invention relates to telecommunication networks, and more particularly, to a system and method of determining end point candidates for an optical channel in a data network.

BACKGROUND OF THE INVENTION

Traffic management is an important task for any data or communication network, especially high-speed networks. In particular, traffic congestion need to be detected and alleviated by identifying alternate routes and rerouting traffic. In optical networks such as metropolitan and access optical networks, congestion in a data channel may develop between two or more network elements or nodes. To alleviate the congestion, an express channel providing a secondary light path may be provisioned to reroute traffic. However, traffic analysis has shown that it may not be optimal to simply set up the alternate path between the two network nodes experiencing congestion. On the other hand, the amount of CPU resources and time required to analyze the traffic conditions and simulate possible express channel configurations and arrive at the optimal solution makes this process impracticable in a high-speed network.

SUMMARY OF THE INVENTION

It may be seen from the foregoing that it is desirable to perform some analysis of the traffic conditions in the network to provide a more focused list of candidates for the data channel end points so that an optimal solution can be calculated quickly without a heavy CPU burden.

In accordance with an embodiment of the present invention, a method of determining end points for a data channel in a data network to off-load traffic from a target data link is provided. The method includes the steps of identifying ingress network nodes sourcing traffic through the target data link, and determining an average ingress bandwidth sourced by the ingress network nodes. Thereafter, the method includes the steps of identifying egress network nodes sinking traffic from the target data link, and determining an average egress bandwidth sunk by the egress network nodes. The data channel start point candidates are identified to include ingress network nodes sourcing more traffic than the average ingress bandwidth, and the data channel end point candidates are identified to include egress network nodes sinking more traffic than the average egress bandwidth.

In accordance with another embodiment of the present invention, a method of provisioning an optical channel in an optical network to off-load traffic from a target optical link is provided. The method includes the steps of identifying ingress network nodes sourcing traffic through the target optical link, determining an average ingress bandwidth sourced by the ingress network nodes, identifying egress network nodes sinking traffic from the target optical link, and determining an average egress bandwidth sunk by the egress network nodes. The method further includes identifying optical channel start point candidates to include ingress network nodes sourcing more traffic than the average ingress bandwidth, and identifying optical channel end point candidates to include egress network nodes sinking more traffic than the average egress bandwidth. Thereafter, an optimal optical channel is determined based on the start and end point candidates, and the optimal optical channel may be automatically provisioned upon user acceptance.

In accordance with yet another embodiment of the present invention, an optical network includes a network element operable to determine end points for an optical channel in an optical network to off-load traffic from a target optical link. The network element is operable to identify ingress network nodes sourcing traffic through the target optical link, determine an average ingress bandwidth sourced by the ingress network nodes, identify egress network nodes sinking traffic from the target optical link, and determine an average egress bandwidth sunk by the egress network nodes. The network element is further operable to identify optical channel start point candidates to include ingress network nodes sourcing more traffic than the average ingress bandwidth, and identify optical channel end point candidates to include egress network nodes sinking more traffic than the average egress bandwidth.

A technical advantage of the present invention is that a short cut is provided for the provisioning of an optical channel or express channel to off-load congested traffic experienced by a network link. Instead of simulating express channel configurations using all possible start and end nodes, which is a time and CPU-intensive process, a shortened list of candidates are used. Thus, considerable CPU resources and time are saved.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
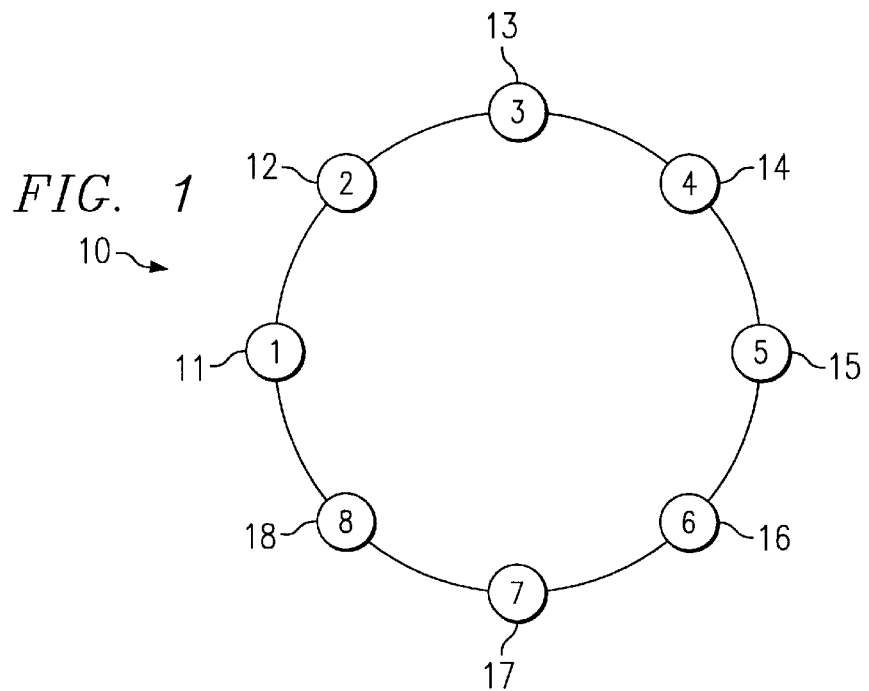
FIG. 1 is a topographical diagram of an exemplary ring optical network.
Figure 3:
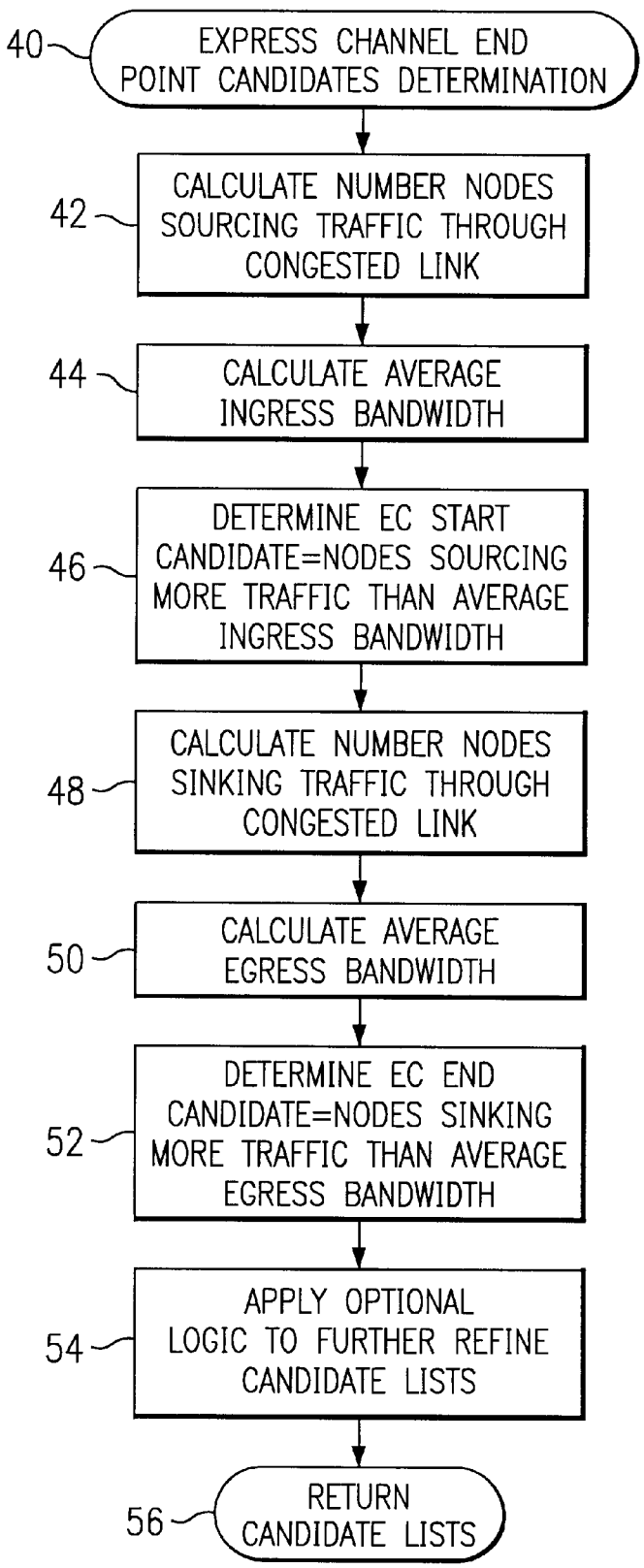
FIG. 3 is a flowchart of an express channel end point candidate determination process according to the teachings of the present invention.

The preferred embodiment of the present invention and its advantages are best understood by referring to FIGS. 1 and 3 of the drawings, like numerals being used for like and corresponding parts of the various drawings.

FIG. 1 is a block diagram representation of an optical ring network 10. Optical ring network 10 includes eight nodes or network elements 11–18, which function to add/drop optical signals and provide conversion to and from electrical signals. Network elements 11–18 may be optical subscriber line access modules (OSLAM) or the higher capacity optical data distribution nodes (ODDN). The number of network elements may vary depending on needed capacity and may have a maximum limit due to practicability. Data and telephony signals may ingress and egress optical network ring 10 at all network elements 11–18. Typically, an optical network consisting of primarily ODDNs services a metropolitan area, and an optical ring primarily consisting of OSLAMs services subscribers in one or more office buildings. The metro optical network is coupled to an access network (not shown) and a long haul backbone (not shown) to transmit the optical data and telephony signals.

Figure 2:
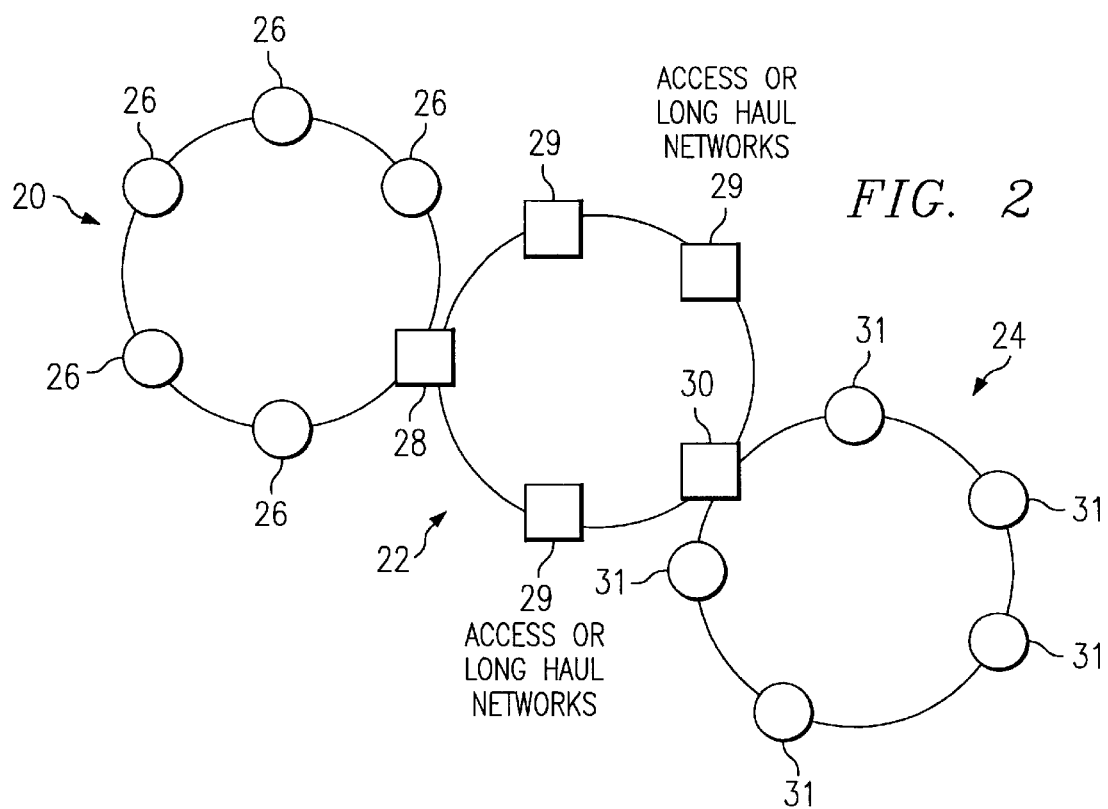
FIG. 2 is a topographical diagram of exemplary access and distribution optical networks.

As shown in FIG. 2, a network 20 primarily including OSLAMs 26 may be coupled to a metro optical network 22 via an ODDN 28, which includes nodes 29 and a node 30 further coupled to a third network 24 with network elements 31. For clarity and ease of illustration, OSLAMs are depicted as circle icons and ODDNs are depicted as square icons. When data traffic in similar networks are studied, a large percentage of signals entering networks 20 and 24 exit networks 20 and 24 via ODDNs 28 and 30 to reach subscribers coupled to network 22 or to the long haul or access networks. Each ODDN may be capable of supporting more than one OSLAM networks. Traffic in each network is bi-directional, with multiple label switched paths (LSPs) transmitting multiple wavelengths and spanning two or more network elements.

The present invention provides a determination of the best end point candidates for creating an express channel to off-load a target link in the network, which is typically the most congested link in the network. As an example, TABLE A below shows traffic conditions in a network.

thereafter made of the express channel start node candidates, which are nodes that source more traffic than the average ingress bandwidth.

TABLE B

| Node    | 1  | 2  | 3  | 4  | 5  | 6  | 7  | 8  |
|---------|----|----|----|----|----|----|----|----|
| Ingress | 10 | 20 | 30 | 40 |    |    |    |    |
| Egress  |    |    |    |    | 40 | 30 | 20 | 10 |

As shown in TABLE B, nodes 3 and 4 source more traffic than the average bandwidth. A determination is then made of the nodes that sink (egress) traffic that pass through the same congested optical link, as shown in block 48. In this example, four nodes, nodes 5 through 8 sink traffic passing through the congested link. As shown in block 50, the

TABLE A

| LSP | BW | Ingress | Egress | Link 1–2 | Link 2–3 | Link 3–4 | Link 4–5 | Link 5–6 | Link 6–7 | Link 7–8 |
|-----|----|---------|--------|----------|----------|----------|----------|----------|----------|----------|
| 1   | 10 | 1       | 2      | 10       | 0        | 0        | 0        | 0        | 0        | 0        |
| 2   | 10 | 1       | 3      | 10       | 10       | 0        | 0        | 0        | 0        | 0        |
| 3   | 10 | 1       | 4      | 10       | 10       | 10       | 0        | 0        | 0        | 0        |
| 4   | 10 | 1       | 5      | 10       | 10       | 10       | 10       | 0        | 0        | 0        |
| 5   | 10 | 2       | 3      | 0        | 10       | 0        | 0        | 0        | 0        | 0        |
| 6   | 10 | 2       | 4      | 0        | 10       | 10       | 0        | 0        | 0        | 0        |
| 7   | 10 | 2       | 5      | 0        | 10       | 10       | 10       | 0        | 0        | 0        |
| 8   | 10 | 2       | 6      | 0        | 10       | 10       | 10       | 10       | 0        | 0        |
| 9   | 10 | 3       | 4      | 0        | 0        | 10       | 0        | 0        | 0        | 0        |
| 10  | 10 | 3       | 5      | 0        | 0        | 10       | 10       | 0        | 0        | 0        |
| 11  | 10 | 3       | 6      | 0        | 0        | 10       | 10       | 10       | 0        | 0        |
| 12  | 10 | 3       | 7      | 0        | 0        | 10       | 10       | 10       | 10       | 0        |
| 13  | 10 | 4       | 5      | 0        | 0        | 0        | 10       | 0        | 0        | 0        |
| 14  | 10 | 4       | 6      | 0        | 0        | 0        | 10       | 10       | 0        | 0        |
| 15  | 10 | 4       | 7      | 0        | 0        | 0        | 10       | 10       | 10       | 0        |
| 16  | 10 | 4       | 8      | 0        | 0        | 0        | 10       | 10       | 10       | 10       |
|     |    |         |        | 40       | 70       | 90       | 100      | 60       | 30       | 10       |

As shown in TABLE A above and referring also to FIG. 1, LSP 1 ingresses at node 1 and egresses at node 2, LSP 2 ingresses at node 1 and egresses at node 3, and so on. As a result, LSP 1 contributes ten bandwidths of traffic across the optical link between nodes 1 and 2, LSP 2 contributes ten bandwidths of traffic across the optical link across nodes 1 and 2 as well as the optical link across nodes 2 and 3. The traffic on the optical link between nodes 4 and 5 is the heaviest, at 100 bandwidths (shown in bold). An assumption is made that the traffic is routed via the shortest route, so that no traffic will traverse more than four nodes. Furthermore, the present invention considers end point candidates that contribute to bandwidth congestion only in the direction that congestion occurred.

FIG. 3 is a flowchart of an embodiment of a process 40 for determining a list of end point candidates of an express channel to off-load congested nodes according to the teachings of the present invention. A determination is first made of the nodes that source (ingress) traffic that pass through the congested optical link (link between nodes 4 and 5 in the above example), as shown in block 42. TABLE B below shows that nodes 1 through 4 contribute to traffic across the 4–5 optical link, which is four links. A determination is then made of the average ingress bandwidth across all the optical links, as shown in block 44. In the present example, the average bandwidth is 25 (100 bandwidth across links 4–5 divided by 4). As shown in block 46, a determination is average egress bandwidth is then calculated, which in this example is the same as the ingress average bandwidth. In block 52, the nodes that sink more traffic than the average egress bandwidth are then candidates for the express channel end point. As shown in TABLE B, nodes 5 and 6 sink more traffic than the average bandwidth. Therefore, the process of the present invention determines that nodes 3 and 4 are candidates for express channel start point and nodes 5 and 6 are candidates for express channel end point. In block 54, optional logic may be further applied to the candidate nodes to further refine the candidate list. The candidate list is then returned.

Once the candidate list is determined, network traffic using the express channel end point candidates may be simulated to determine the best express channel configuration. Ideally, the simulation takes into account the impact on traffic flowing in the opposite direction down the newly created express channel, since express channels are bi-directional. The express channel using the best configuration is then automatically created to off-load the congested data channel traffic.

TABLE C below provides another example for illustrating the present invention.

TABLE C

| LSP | BW | Ingress | Egress | Link 1–2 | Link 2–3 | Link 3–4 | Link 4–5 | Link 5–6 | Link 6–7 | Link 7–8 |
|---|---|---|---|---|---|---|---|---|---|---|
| 1 | 10 | 1 | 2 | 10 | 0 | 0 | 0 | 0 | 0 | 0 |
| 2 | 10 | 1 | 3 | 10 | 10 | 0 | 0 | 0 | 0 | 0 |
| 3 | 10 | 1 | 4 | 10 | 10 | 10 | 0 | 0 | 0 | 0 |
| 4 | 10 | 1 | 5 | 10 | 10 | 10 | 10 | 0 | 0 | 0 |
| 5 | 10 | 2 | 3 | 0 | 10 | 0 | 0 | 0 | 0 | 0 |
| 6 | 10 | 2 | 4 | 0 | 10 | 10 | 0 | 0 | 0 | 0 |
| 7 | 10 | 2 | 5 | 0 | 10 | 10 | 10 | 0 | 0 | 0 |
| 8 | 10 | 2 | 6 | 0 | 10 | 10 | 10 | 10 | 0 | 0 |
| 9 | 10 | 3 | 4 | 0 | 0 | 10 | 0 | 0 | 0 | 0 |
| 10 | 10 | 3 | 5 | 0 | 0 | 10 | 10 | 0 | 0 | 0 |
| 11 | 10 | 3 | 6 | 0 | 0 | 10 | 10 | 10 | 0 | 0 |
| 12 | 10 | 3 | 7 | 0 | 0 | 10 | 10 | 10 | 10 | 0 |
| 13 | 50 | 4 | 5 | 0 | 0 | 0 | 50 | 0 | 0 | 0 |
| 14 | 50 | 4 | 6 | 0 | 0 | 0 | 50 | 50 | 0 | 0 |
| 15 | 50 | 4 | 7 | 0 | 0 | 0 | 50 | 50 | 50 | 0 |
| 16 | 50 | 4 | 8 | 0 | 0 | 0 | 50 | 50 | 50 | 50 |
|  |  |  |  | 40 | 70 | 90 | 260 | 180 | 110 | 50 |

It may be seen that the average bandwidth is 65 (260 bandwidth across link 4–5 divided by 4). The ingress and egress average bandwidths are equal in this example. It may be seen that, according to the present invention, node 4 is a candidate for the express channel starting point, and nodes 5 and 6 are candidates for the express channel end point.

TABLE D

| Node | 1 | 2 | 3 | 4 | 5 | 6 | 7 | 8 |
|---|---|---|---|---|---|---|---|---|
| Ingress | 10 | 20 | 30 | 200 |  |  |  |  |
| Egress |  |  |  |  | 80 | 70 | 60 | 50 |

A third example:

TABLE E

| LSP | BW | Ingress | Egress | Link 1–2 | Link 2–3 | Link 3–4 | Link 4–5 | Link 5–6 | Link 6–7 | Link 7–8 |
|---|---|---|---|---|---|---|---|---|---|---|
| 1 | 10 | 1 | 2 | 10 | 0 | 0 | 0 | 0 | 0 | 0 |
| 2 | 10 | 1 | 3 | 10 | 10 | 0 | 0 | 0 | 0 | 0 |
| 3 | 10 | 1 | 4 | 10 | 10 | 10 | 0 | 0 | 0 | 0 |
| 4 | 15 | 1 | 5 | 15 | 15 | 15 | 15 | 0 | 0 | 0 |
| 5 | 10 | 2 | 3 | 0 | 10 | 0 | 0 | 0 | 0 | 0 |
| 6 | 10 | 2 | 4 | 0 | 10 | 10 | 0 | 0 | 0 | 0 |
| 7 | 15 | 2 | 5 | 0 | 15 | 15 | 15 | 0 | 0 | 0 |
| 8 | 10 | 2 | 6 | 0 | 10 | 10 | 10 | 10 | 0 | 0 |
| 9 | 10 | 3 | 4 | 0 | 0 | 10 | 0 | 0 | 0 | 0 |
| 10 | 15 | 3 | 5 | 0 | 0 | 15 | 15 | 0 | 0 | 0 |
| 11 | 10 | 3 | 6 | 0 | 0 | 10 | 10 | 10 | 0 | 0 |
| 12 | 10 | 3 | 7 | 0 | 0 | 10 | 10 | 10 | 10 | 0 |
| 13 | 15 | 4 | 5 | 0 | 0 | 0 | 15 | 0 | 0 | 0 |
| 14 | 10 | 4 | 6 | 0 | 0 | 0 | 10 | 10 | 0 | 0 |
| 15 | 10 | 4 | 7 | 0 | 0 | 0 | 10 | 10 | 10 | 0 |
| 16 | 10 | 4 | 8 | 0 | 0 | 0 | 10 | 50 | 10 | 10 |
|  |  |  |  | 45 | 80 | 105 | 120 | 60 | 30 | 10 |

It may be seen that the average bandwidth is 30 (120 bandwidth across link 4–5 divided by 4). The ingress and egress average bandwidths are equal in this example. It may be seen that, according to the present invention, nodes 3 and 4 are candidates for the express channel starting point, and node 5 is a candidate for the express channel end point.

TABLE F

| Node | 1 | 2 | 3 | 4 | 5 | 6 | 7 | 8 |
|---|---|---|---|---|---|---|---|---|
| Ingress | 15 | 25 | 35 | 45 |  |  |  |  |
| Egress |  |  |  |  | 60 | 30 | 20 | 10 |

Using the present invention, a short list of express channel end point candidates is generated so that the optimal express channel configuration and LSP rerouting can be determined quickly without intensive CPU processing time. The express channel can be provisioned automatically if wavelengths are available and tunable optical filters and lasers are used. Alternatively, the user is presented with the optimal express channel configuration that, upon acceptance by the user, initiates the express channel provisioning. If the addition of new hardware is required, the movement of the LSPs to the new express channel is presented as a separate action to the user. Although the present invention has been described in the context of an optical network having a ring configuration, the present invention is also applicable to networks having other configurations.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of determining end points for a data channel in a data network to off-load traffic from a target data link, comprising:

identifying ingress network nodes sourcing traffic through the target data link;
determining an average ingress bandwidth sourced by the ingress network nodes;
identifying egress network nodes sinking traffic from the target data link;
determining an average egress bandwidth sunk by the egress network nodes;
identifying data channel start point candidates to include ingress network nodes sourcing more traffic than the average ingress bandwidth; and
identifying data channel end point candidates to include egress network nodes sinking more traffic than the average egress bandwidth.

2. The method, as set forth in claim 1, further comprising determining an optimal data channel based on the start and end point candidates.

3. The method, as set forth in claim 2, automatically provisioning the optimal data channel.

4. The method, as set forth in claim 1, further comprising identifying the target data link as a data link experiencing congested traffic.

5. The method, as set forth in claim 4, wherein identifying ingress network nodes sourcing traffic through the target optical link comprises identifying ingress network nodes sourcing traffic in the same direction as the congested traffic in the target data link, and identifying egress network nodes sinking traffic from the target data link comprises identifying egress network nodes sinking traffic in the same direction as the congested traffic in the target data link.

6. A method of provisioning an optical channel in an optical network to off-load traffic from a target optical link, comprising:
identifying ingress network nodes sourcing traffic through the target optical link;
determining an average ingress bandwidth sourced by the ingress network nodes;
identifying egress network nodes sinking traffic from the target optical link;
determining an average egress bandwidth sunk by the egress network nodes;
identifying optical channel start point candidates to include ingress network nodes sourcing more traffic than the average ingress bandwidth;
identifying optical channel end point candidates to include egress network nodes sinking more traffic than the average egress bandwidth;
determining an optimal optical channel based on the start and end point candidates; and
automatically provisioning the optimal optical channel.

7. The method, as set forth in claim 6, further comprising simulating network traffic conditions on optical channel configurations using different start and end point candidates.

8. The method, as set forth in claim 6, wherein the target optical link is an optical link experiencing congested traffic.

9. The method, as set forth in claim 8, wherein identifying ingress network nodes sourcing traffic through the target optical link comprises identifying ingress network nodes sourcing traffic in the same direction as the congested traffic in the target optical link, and identifying egress network nodes sinking traffic from the target optical link comprises identifying egress network nodes sinking traffic in the same direction as the congested traffic in the target optical link.

10. An optical network, comprising:
a network element operable to determine end points for an optical channel in an optical network to off-load traffic from a target optical link, the network element being operable to:
identify ingress network nodes sourcing traffic through the target optical link;
determine an average ingress bandwidth sourced by the ingress network nodes;
identify egress network nodes sinking traffic from the target optical link;
determine an average egress bandwidth sunk by the egress network nodes;
identify optical channel start point candidates to include ingress network nodes sourcing more traffic than the average ingress bandwidth; and
identify optical channel end point candidates to include egress network nodes sinking more traffic than the average egress bandwidth.

11. The optical network, as set forth in claim 10, wherein the target optical link is an optical link experiencing congested traffic.

12. The optical network, as set forth in claim 10, wherein the optical network has a ring configuration.

13. The optical network, as set forth in claim 12, wherein identifying ingress network nodes sourcing traffic through the target optical link comprises identifying ingress network nodes sourcing traffic in the same direction as the congested traffic in the target optical link, and identifying egress network nodes sinking traffic from the target optical link comprises identifying egress network nodes sinking traffic in the same direction as the congested traffic in the target optical link.

14. A method for setting up a second data path onto which traffic from a first data path can be offloaded, the first data path having a target portion transmitting data sourced by a plurality of ingress points and sunk by a plurality of egress points, the method comprising,
identifying for analysis candidate ingress points from among the plurality of ingress points to include those of the plurality of ingress points having relatively larger ingress bandwidths; and
identifying for analysis candidate egress points from among a plurality of egress points to include those egress nodes with relatively larger egress bandwidths.

15. The method of claim 14, further comprising simulating the effects of offloading traffic to be transmitted between a candidate ingress point and a candidate egress point onto the second data path.

16. The method of claim 15, further including setting up the second data path.

17. The method of claim 14, wherein identifying the candidate ingress points includes,
averaging ingress bandwidths for the plurality of ingress points to determine an average ingress bandwidth; and
comparing an ingress bandwidth at each of the plurality of ingress points to the average ingress bandwidth.

18. The method of claim 14, wherein identifying the candidate egress points includes,
averaging egress bandwidths for the plurality of egress points to determine an average egress bandwidth; and
comparing an egress bandwidth at each of the plurality of egress points to the average egress bandwidth.

19. The method of claim 14, further identifying the target portion of the first data path.

20. The method of claim 17, where identifying the target portion of the first data path includes identifying the portion of the data path suffering from congestion.

21. The method of claim 14, further comprising simulating the effects of offloading traffic between certain of the selected ingress points and egress points on to a second path in order to select an ingress point and an egress point for the second data path; wherein
    selecting the candidate ingress points includes,
        averaging ingress bandwidths for the plurality of ingress points to determine an average ingress bandwidth; and
        comparing an ingress bandwidth at each of the plurality of ingress points to the average ingress bandwidth, and
    selecting the candidate egress points includes,
        averaging egress bandwidths for the plurality of egress points to determine an average egress bandwidth; and
        comparing an egress bandwidth at each of the plurality of egress points to the average egress bandwidth.

22. A computer readable memory storing instructions that, when read by a computer, cause the computer to execute the following:
    identifying ingress nodes sourcing traffic through a target data link;
    determining an average ingress bandwidth for the traffic sourced by all of the ingress network nodes;
    identifying egress nodes sinking traffic from the target data link;
    determining an egress bandwidth for traffic sunk by the egress nodes;
    identifying data channel start point candidates to include ingress nodes sourcing more traffic than the average ingress bandwidth; and
    identifying data channel end paint candidates to include egress nodes sinking more traffic than the average egress bandwidth.

23. The computer readable memory of claim 22 further storing instructions for causing the computer to determine an optimal data channel based on the start and end point candidates.

24. The computer readable memory of claim 22, wherein the target data link is a data link experiencing congested traffic.

25. The computer readable memory of claim 22, wherein identifying ingress network nodes sourcing traffic through the target optical link comprises identifying ingress network nodes sourcing traffic in the same direction as the congested traffic in the target data link, and identifying egress network nodes sinking traffic from the target data link comprises identifying egress network nodes sinking traffic in the same direction as the congested traffic in the target data link.

26. A computer readable memory storing instructions that, when read by a computer, cause the computer to identify, in order to perform further traffic analysis, a list of candidate endpoints for a second data path on to which to offload traffic from a first data path, the first data path having a target portion transmitting data sorted by a plurality of ingress points and sunk by a plurality of egress points by,
    identifying at least one candidate ingress point from among the plurality of ingress points having a relatively large ingress bandwidth; and
    identifying at least one candidate egress point from among a plurality of egress points having a relatively larger egress bandwidth.

27. The computer readable memory of claim 26, wherein the instructions further cause the computer to simulate effects of offloading traffic to be transmitted between the at least one candidate ingress point and the at least one candidate egress point on to the second data path.

28. The computer readable memory of claim 26, wherein identifying the at least one candidate ingress point includes,
    averaging ingress bandwidths for the plurality of ingress points to determine an average ingress bandwidth;
    comparing an ingress bandwidth at each of the plurality of ingress points to the average ingress bandwidth; and
    selecting as the at least one candidate ingress point one of the plurality of ingress points having an ingress bandwidth greater than the average ingress bandwidth.

29. The computer readable memory of claim 26, wherein identifying the candidate egress point includes,
    averaging egress bandwidths for the plurality of egress points to determine an average ingress bandwidth;
    comparing an egress bandwidth at each of the plurality of egress points to the average egress bandwidth; and
    selecting as the at least one candidate egress point one of the plurality of egress points having an egress bandwidth greater than the average egress bandwidth.

30. The computer readable memory of claim 26, wherein the instructions further cause the computer to simulate effects of offloading traffic to be transmitted between the at least one candidate ingress point and the at least one candidate egress point on to the second data path;
    identifying the candidate ingress point includes,
        averaging ingress bandwidths for the plurality of ingress points to determine an average ingress bandwidth;
        comparing an ingress bandwidth at each of the plurality of ingress points to the average ingress bandwidth; and
    selecting as the candidate ingress point one of the plurality of ingress points having an ingress bandwidth greater than the average ingress bandwidth; and
    identifying the candidate egress point includes,
        averaging egress bandwidths for the plurality of egress points to determine an average ingress bandwidth;
        comparing an egress bandwidth at each of the plurality of egress points to the average egress bandwidth; and
        selecting as the candidate egress point one of the plurality of egress points having an egress bandwidth greater than the average egress bandwidth.

\* \* \* \* \*